June 17, 1952 W. S. PATTERSON 2,601,001
GAS GENERATOR AND WASTE HEAT BOILER
Filed Oct. 30, 1947 4 Sheets-Sheet 1

INVENTOR.
W. S. Patterson
BY
ATTORNEYS.

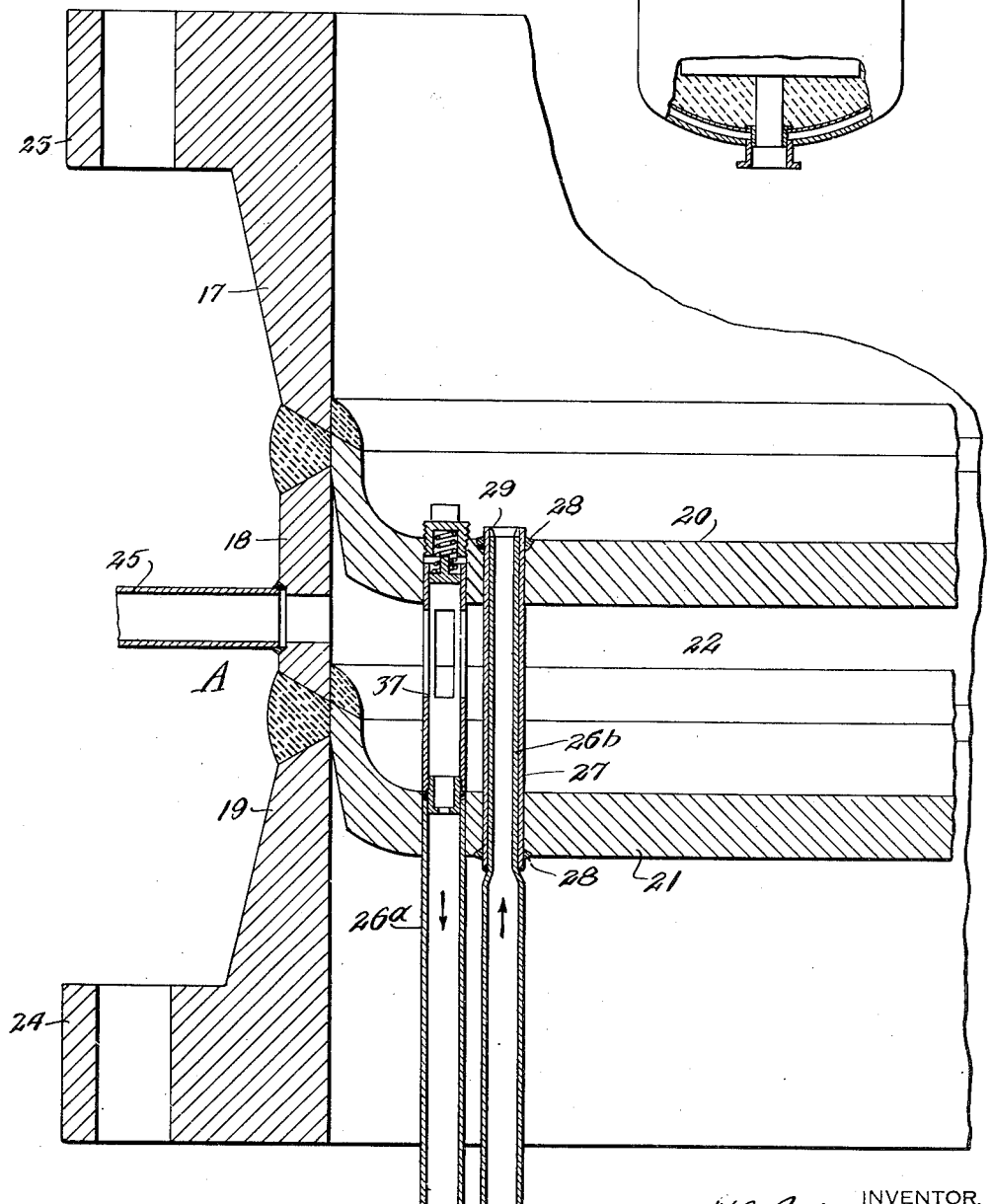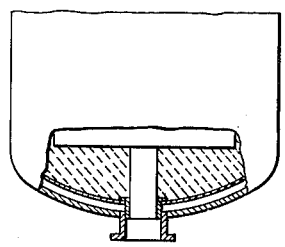

June 17, 1952  W. S. PATTERSON  2,601,001
GAS GENERATOR AND WASTE HEAT BOILER
Filed Oct. 30, 1947  4 Sheets-Sheet 3
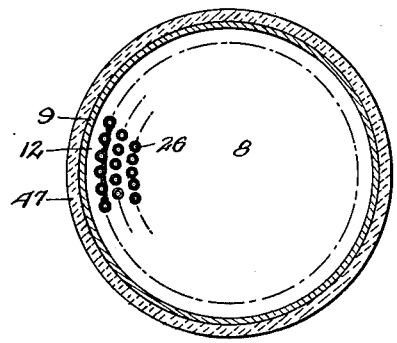
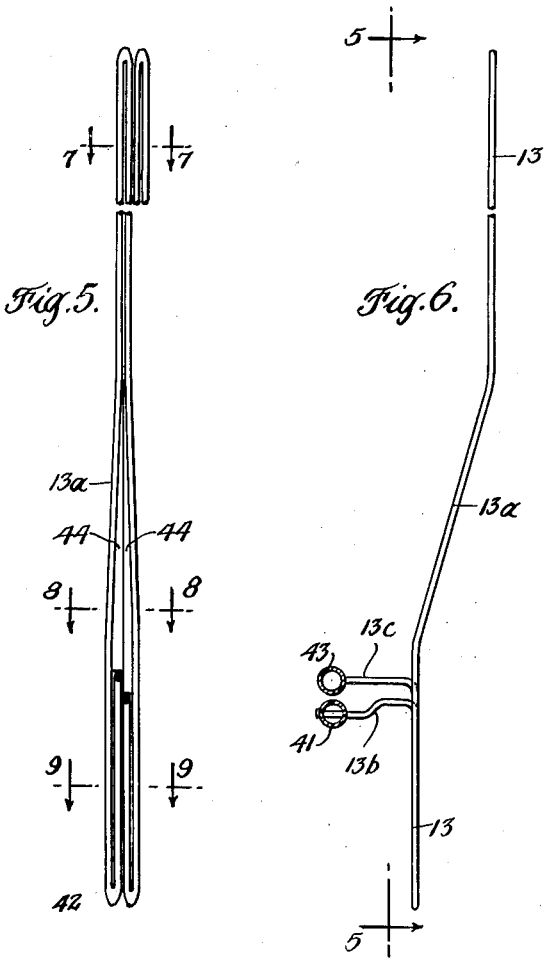
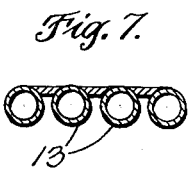
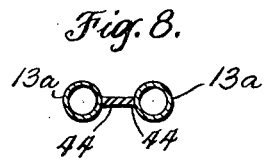
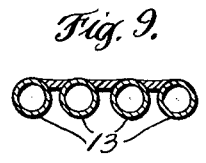
INVENTOR.
W. S. Patterson
BY
ATTORNEYS.

June 17, 1952 W. S. PATTERSON 2,601,001
GAS GENERATOR AND WASTE HEAT BOILER
Filed Oct. 30, 1947 4 Sheets-Sheet 4

INVENTOR
W. S. Patterson
BY
ATTORNEYS

Patented June 17, 1952

2,601,001

UNITED STATES PATENT OFFICE 2,601,001

GAS GENERATOR AND WASTE HEAT BOILER

Ward S. Patterson, Chappaqua, N. Y., assignor to Combustion Engineering-Superheater, Inc., a corporation of Delaware Application October 30, 1947, Serial No. 783,108

10 Claims. (Cl. 48—196)

This invention relates to a gas generator and waste heat boiler for use in systems for converting natural gas into gasoline and other fuels and by-products thereof and the like, and similar systems.

In such systems, the natural gas is delivered at high temperatures (ordinarily in the neighborhood of about 1200° F.) and at high pressures (usually in the neighborhood of 265–300 p. s. i.) into a gas generator where it is burned with a deficiency of oxygen, i. e. under reducing conditions, by which the methane of which the natural gas is very largely composed is converted into carbon monoxide and hydrogen. The combustion occurs at relatively high temperature, usually about 2500° F., and at the pressure previously noted. Customarily oxygen of about 95 to about 99° purity is used as the oxidant and delivered along with the gas for intimate admixture therewith. The oxygen is also preheated to high temperature, usually in the neighborhood of 600° F. or higher and is also delivered at the pressure previously noted.

The gas generated is cooled from the high temperature of combustion to a temperature at which it may safely contact with unprotected metals, usually to about 600° F.

The cooled gases are finally led to a catalytic reactor, where the carbon monoxide and hydrogen are rearranged to produce the desired fuels and by-products.

This invention has to do with that phase of the process in which the gases are generated and cooled.

It will be seen from what has been said that the conditions of operation are very severe. One of the primary objects of the invention is to provide a simple and effective arrangement of gas generator and waste heat boiler which will withstand the severe operating conditions.

Installations for processing of the natural gas have heavy steam requirements and therefore it is another object of the invention to combine with the gas generator a simple and effective arrangement of waste heat boiler parts such as will generate as much steam as possible by recovery of heat developed during the combustion of the gases to the end that the size of the auxiliary steam equipment needed will thereby be reduced.

How the foregoing together with such other objects and advantages as may hereafter appear or are incident to my invention are realized is illustrated in the accompanying drawings wherein:

Figure 2 is an enlarged fragmentary sectional view illustrating certain details of the invention;

Figure 3 is a broken-out diagrammatic view of a modification of the invention;

Figure 4 is a section taken along the line 4—4 of Figure 1;

Figure 5 is a diagrammatic view illustrating a tube unit employed as part of the boiler taken on the line 5—5 of Figure 6;

Figure 6 is a side elevation of Figure 5;

Figure 10:
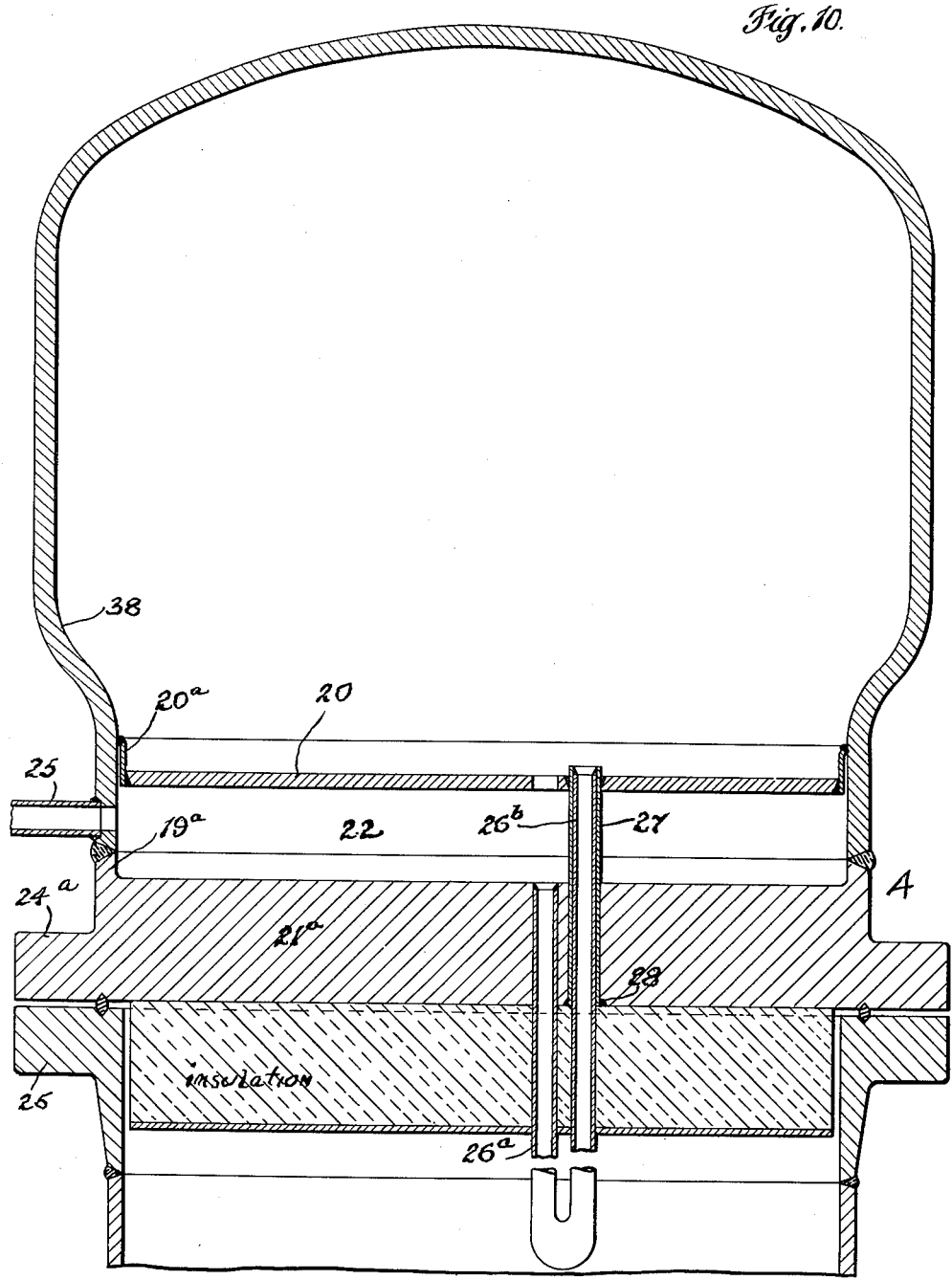

Figures 7, 8 and 9 are sectional views taken on the lines 7—7, 8—8 and 9—9 of Figure 5, drawn on an enlarged scale with the parts slightly spread apart; and Figure 10 is a sectional view of a modification of the arrangement of Figure 2.

Figure 1:
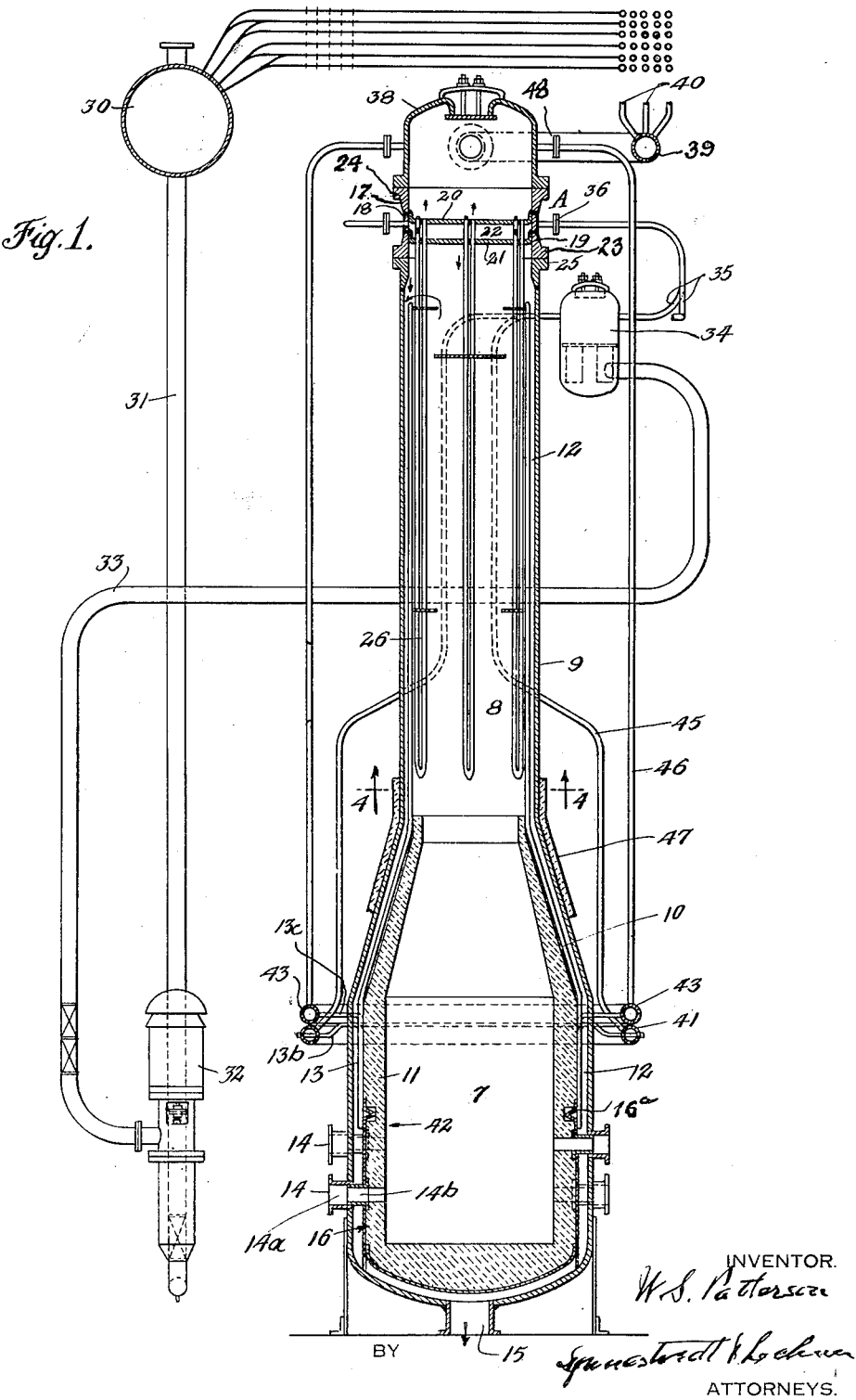
Figure 1 is a diagrammatic vertical section through a gas generator and boiler embodying my invention.

Referring now to Figure 1, reference character 7 indicates the furnace section into which the natural gas in introduced for processing, and the reference numeral 8 the cooling section which communicates with the upper part of the furnace section, the two sections being vertically serially arranged. The height of the installation is about seventy feet and the outside diameter of the furnace section is about twelve feet from which dimensions the size of the other parts may be visualized.

The two sections are provided by means of the casing 9 which is of welded construction so as to be gas and pressure tight and which is circular in cross-section to withstand the pressures.

It will be seen that the lower portion of the furnace section is of larger diameter than the cooling section and that the upper portion of the furnace section tapers inwardly to provide a throat 10, which merges into the cooling section. One of the reasons for making the furnace section of larger diameter is to reduce the overall height of the furnace section so that a substantially self-supporting refractory lining 11 may be employed to line the furnace section.

The outside diameter of the lining is substantially less than the inside diameter of the casing at the furnace section to provide an annular space 12 between the casing and the lining. In this space and located close to the outer surface of the lining, is a tubular water wall 13 which extends upwardly from the point adjacent to the burner opening 14 (each of which will be fitted with a burner for introducing the gases in a proper manner), to a point just short of the top of the casing 9, i. e. just short of the top of the cooling section. Where the water wall passes along the inside of the throat and cooling section, it is also spaced away from the wall of the casing so that there is an annular passage between the casing from the top of the water wall all the way down to and around the bottom of the furnace section. At the bottom, the furnace section is provided with an outlet 15 for cooled gas. The lower portion of the lining 11 is surrounded and supported by a casing or shell 16, with an expansion joint 16a therebetween.

The top of the cooling section is closed by a closure member indicated as a whole by the reference character A. On inspection of Figures 1 and 2 it will be seen that this closure member comprises a ring-like coupling member composed of rings 17, 18 and 19 welded together. Two dished diaphragms 20 and 21 are welded in spaced relation at a point about midway of the coupling member, as indicated in Figure 2, thus providing an internal space or chamber 22 the purpose of which will hereinafter appear. Rings 17 and 19 are provided with a coupling flange 23 and 24, respectively. The lips of the diaphragms serve as backing up members for the welding together of the adjacent cylindrical parts; and the lips themselves are also welded to such parts at the lip edge.

In operation the pressure in the space 22 is only slightly greater than in dome 38, but the pressure in both these spaces may at times be very great compared to the gas pressure in the space 8. This results in a large bending force on the tube sheets 20 and 21 which are stayed by the tubes 27, thus providing a girder-like construction in which both upper and lower tube sheets work together, and, with the numerous closely spaced stay tubes, resists the bending caused by differential pressure and the weight of the suspended tube bundle 26.

In another arrangement of closure A and dome 38, as illustrated in Figure 10, the tube sheet 21a and the flange parts 19a and 24a are parts of an integral forging. The tube sheet 21a may be made thick enough to resist the entire bending moment imposed by differential pressure between compartment 22 and compartment 8, in which case tube sheet 20 may be very thin since the differential pressure across it is of the order of 20 to 40 p. s. i. and it is stayed by the tubes 27. Figure 10 also illustrates how the dome enclosure 38 may be integrally connected, as by welding, to a lip 19a of the tube sheet 21a, thus greatly reducing the amount of welding required for assembly and eliminating the flanged joint between the dome 38 and closure A which was shown in Figure 1. Ring 20a is welded to sheet 20 and to dome 38.

It is a feature of the constructions shown for closure A in Figure 2 and Figure 10 to provide an inlet chamber 22 having a spacing between tube sheets which is only 5 to 8 inches, so that the tube ends 26a may be readily rolled or welded into tube sheet 21 with tube sheet 20 in place, and so that the stay tubes 27 and tube extension 26b and tubes 37 for mounting orifices will all be as short as possible.

At the top the casing has welded thereto a flanged coupling member 25 (shown in Figures 1 and 10). The closure A in Figure 10 is secured to the casing by means of the flanged ring 24a and the flanged coupling member 25 as by bolts, not shown, with an interposed gasket or the like, not shown, to provide a hermetically sealed joint. As an alternative the members 24a and 25 may be secured together by a seal weld which may be cut for disassembly purposes.

Suspended from the closure A is a tube bundle 26 which very largely fills the space of the cooling section inside the tubular water wall, cross-sectionally considered. This tube bundle extends downwardly to a point adjacent to the upper end of the throat 10. The function of this tube bundle and of that portion of the tube wall which is located within the cooling section is to cool the gases leaving the furnace section 7 to a temperature low enough that the gases may safely contact with the surfaces of the coupling members 19 and 25 and the casing. The evaporating surface in the tube bundle and such portion of the tube wall is sufficient to accomplish this result (about 10,000 square feet in the installation shown). Ordinarily the surface provided is sufficient to cool the gases to approximately 600° F. by the time such gases reach the top of the gas cooling section. At such temperature the gases may now be safely passed downwardly into the space between the water wall and the casing for eventual discharge at the bottom of the furnace section. In such passage the water wall serves to further cool the gas. Thus it will be seen that the arrangement of tubes and water wall is such as to very effectively abstract heat from the gases and thereby generate a maximum of steam.

Referring now to Figure 2, the manner in which the tubes of the tube bundle are suspended from the closure A will now be described. Considering one tube, it will be seen that the inlet end 26a is connected to the diaphragm 21 and the tube passes downwardly to a point thus short of the upper end of the throat where it is rebent on itself to pass upwardly along itself, providing two closely spaced tube lengths or passes. The outlet end 26b of the tube may be necked down and passes through the sleeve or stay tube 27 which passes through diaphragm 21 and diaphragm 20, being welded to such diaphragm as indicated at 28. At its upper end, the necked down portion 26b is welded to the upper end of the sleeve 27 as indicated at 29.

In some installations not requiring so compact an arrangement of the tubes, the tube ends 26b need not be necked down because the sleeves or stay tubes 27 may be of larger diameter. In other installations not requiring welding of tubes 26 to the tube sheets 20 and 21, the sleeves 27 may be omitted, in which case tube end 26a is rolled into tube sheet 21 and tube end 26b is rolled into both tube sheets.

Water is supplied to the chamber 22 of the closure from the steam and water drum 30, by pipe 31, forced circulation pump 32, pipe 33, strainer drum 34 and pipes 35, which discharge into the chamber 22. The number of pipes 35 may vary depending upon their size. Breakable joints 36 are provided in pipes 35 for a reason which will hereinafter appear.

Water from chamber 22 enters the inlet end of the tubes 26 by means of removable metering devices 37 calculated by secure uniformity of distribution as between the tubes constituting the bundle. These metering devices are removably carried by the diaphragms so as to be replaceable by metering devices having metering orifices of different size as may be needed.

The steam generated in the tube bundle or rather a mixture of steam and water is discharged from the outlet or delivery ends of the tube 26 into the space above the diaphragm 20 which space is enclosed by the dome 38 secured to the flanged member 17 in a manner the same as flanged coupling member 19 is secured to coupling member 25 as heretofore described. Detachably connected to the dome 38 is a header 39 for the discharge or delivery of water and steam mixture from within the dome to the drum 30. For this purpose a plurality of upcomer or delivery pipes 40 lead from the header to the steam and water drum.

Referring now to the water wall 13, this is composed of a plurality of tubes 13a.

Referring now to Figures 4 to 9 inclusive, it will be seen that the inlet ends 13b of the tubes are connected to the inlet header 41 which is annular or doughnut-shaped and surrounds the furnace section (see Figure 1). From the header, each tube passes inwardly through the casing wall where it is secured thereto by welding, after which it is bent to pass downwardly to the point marked 42 where it is rebent on itself to pass upwardly to a point short of the closure member A (see Figure 1), where it is again rebent on itself to pass downwardly along the cooling section and furnace section to the point marked 42, where it is rebent on itself to pass upwardly with the outlet or delivery end 13c thereof finally passing through the casing wall for connection with the outlet header 43, which is also doughnut-shaped (see Figure 1). Where the outlet end passes through the casing wall, it is welded. With the tube thus rebent on itself, it will be seen there are four tube lengths side by side around the furnace lining in the region of the furnace proper, two closely spaced tube lengths in the cooling section, and two less closely spaced tube lengths in the throat. With the exception of that portion of the tube lengths at the throat, the tube lengths are close together, in fact closer than they are actually shown in Figures 7 to 9, and the spaces therebetween are closed, as by welding the tubes together, as indicated in said Figure 8, to form a continuous wall. At the throat, as will be seen from Figure 5, there will be a slight triangular space between adjacent passes of the tube, this space being filled up with fins 44, welded to the respective tube lengths and to each other to provide, with the tubes, a continuous wall. In the preferred arrangement the diameter at the water wall is exactly twice as great in the furnace section as in the cooling section so that the tubes are equally spaced and close together in both those sections when the number of tubes per circuit is four in the furnace and two in the cooling section as illustrated in Figure 5. There are however other header locations, and water wall tube arrangements, not shown, by means of which the same water wall tube spacing can be accomplished even though the diameter ratio is not 2 to 1.

The inlet header 41 is provided with supply or downcomer tubes 45 which lead from the strainer drum 34, the number of such tubes varying as may be required depending upon their size. The steam generated in the wall tubes, or rather the mixture of such steam and water, is delivered to the outlet header 43 from whence it is delivered to the dome 38 by the upcomer or delivery tubes 46, the number of which will vary depending upon their size.

It is desirable to lag the casing 9 by lagging 47, only a portion of which is shown (see Figure 1).

To improve efficiency the tube bundle is desirably provided with baffles as shown in Figure 1. The wall tubes and the tubes of the bundle are preferably of an outside diameter of 1¼" or 1½", with a wall thickness to suit the internal pressure, such as 0.10 to 0.15 inch.

From what has been said, it will be seen that the furnace section and the cooling section along with the water wall may be assembled in the shop as a unit and shipped as such and set up, or the parts may be shipped and assembled on the ground as a unit and set up. Similarly, the dome, the closure member A and the tube bundle may be assembled in the shop as a unit and shipped and set up, or the parts may be shipped and assembled as a unit on the ground and set up. Access to and inspection of the tube ends at the closure member may be had through the dome which is large enough for that purpose; and minor repairs not involving the replacement of the tubes of the tube bundle may also be made. Replacement of tubes of the tube bundle may be made by removing the dome and closure member A and tube bundle as a unit, this being done by breaking the joint between the members 19 and 25, the breaking of the joints 36, the breaking of the joints 48 in pipes 46, and the disconnecting of the header 39.

Access for inspection of the interior of the cooling section and furnace may be had by removing dome 38, closure A and the tube bundle as a unit, as described. Tubes of the water wall requiring replacement are cut and withdrawn upwardly and new ones inserted for which purpose it is necessary to remove lining 11.

Sections of tubing may however be removed and new pieces welded in place from the inside by the use of "windor-welds" which permits all welding to be done from one side of the water wall.

By terminating the bottom of the water wall at a point above the burners 14, it will be seen that the water wall tubes do not interfere with the burners, and their installation or removal and replacement. Furthermore, additional bending of the water wall tubes, which would otherwise be required to accommodate the burners if the tubes extended therebelow, is eliminated.

In Figure 3, a single burner located in the bottom of the furnace section is illustrated. In this case the cooled gas outlet or outlets would be shifted in location, and the water walls would then be extended to the bottom of the furnace section.

Referring now to Figure 1, it will be seen that the burner openings are composed of two flanged telescoping nipple members 14a and 14b, the nipples 14a being connected to the casing and the nipples 14b being connected to the shell 16 and welded to nipples 14a. This is an arrangement that permits of ease of assemblage.

It will be understood that the burners are respectively supplied with preheated natural gas and preheated oxygen from sources not shown.

It will also be understood that in lieu of a refractory lined reaction or combustion chamber 7 which is an incidental source of hot gases for the waste heat boiler described in this specification, the bottom of the casing 9 may be terminated in a flanged opening designed for connection to some other source of hot gas under pressure similar to my copending application Serial No. 763,343, filed July 24, 1947 and my copending application Serial No. 34,678 filed June 23, 1948, which is a continuation-in-part of my application Serial No. 763,343.

I claim:

1. A gas generator and waste heat boiler for the preparation of synthesis gas and the like comprising an upright cylindrical gas-tight metal casing, a refractory gas generating furnace section open at its upper end and enclosed by said casing and spaced away from the walls thereof, and a gas cooling section located immediately above the open upper end of the furnace section, a cylindrical substantially gas-tight tubular water wall within the casing extending through the space between said sections from a point adjacent the lower end of the casing to a point short of the upper end thereof and spaced away from the casing to provide therewith an annular gas passageway to permit the gases rising through the upper end of the gas cooling section to flow downwardly between the exterior of the water wall and the interior of the metal casing to an outlet in the metal casing toward the bottom thereof, a steam and water drum, circulating connections between the water wall and drum, a bundle of cooling tubes extending downwardly from the top of the metal casing into the upper end of the gas cooling section, circulating connections for said bundle, and reactant inlets passing through the metal casing into the interior of the furnace section.

2. The gas generator and boiler of claim 1, in which the water wall is composed of closely spaced tube lengths provided with closure means closing spaces therebetween.

3. The gas generator and boiler of claim 1 in which a circulation pump is provided for the circulating connections.

4. The gas generator and boiler of claim 1 in which the water wall is composed of units, each unit comprising a tube the inlet end of which passes through the casing wall at the furnace section after which the tube is bent downwardly in the space between the casing and furnace section, then rebent on itself to extend upwardly to extend into the cooling section, then rebent on itself to extend downwardly through the cooling section and into the space between the casing and furnace section to the point where it was first rebent, where it is rebent on itself to extend upwardly with its outlet end passing through the casing wall at the furnace section.

5. The gas generator and boiler of claim 1, in which the water wall is composed of tubes rebent on themselves to form closely spaced incoming and outgoing passes and being provided with closure means closing the spaces between adjacent tubes.

6. The gas generator and boiler of claim 5, in which said circulating connections include an inlet header provided for the inlet ends of said water wall tubes and an outlet header for the outlet ends thereof, said headers surrounding the casing and the end portions of the tubes passing through the casing wall for connection with the headers.

7. The gas generator and boiler of claim 1 in which the cooling section is closed at its upper end by a hollow closure forming a part of said circulating connections, the bundle of cooling tubes is suspended from the closure, and each tube of the bundle is rebent on itself to form adjacent incoming and outgoing passes with the inlet end of each tube opening into the interior of the closure and with the outlet end of each tube extending through the closure.

8. The gas generator and boiler of claim 7 in which said closure is capped with a dome for collecting steam and water mixture discharged from said cooling tubes and constituting a part of said circulating connections.

9. The gas generator and boiler of claim 7 in which said closure is capped with a dome for collecting steam and water mixture discharged from said cooling tubes and in which said dome is provided with delivery tubes connected to said steam and water drum, said dome and delivery tubes forming part of said circulating connections.

10. The gas generator and boiler of claim 7, in which the closure comprises a ring-like coupling member provided with two vertically spaced diaphragms to provide a chamber and in which the inlet ends of the tubes of the bundle are connected to the lower diaphragm and are provided with inlet metering orifice devices and the outlet ends of said tubes pass through the diaphragms to discharge above the upper diaphragm.

WARD S. PATTERSON.

REFERENCES CITED

The following references are of record in the file of this patent:

UNITED STATES PATENTS

| Number | Name | Date |
|---|---|---|
| 387,100 | Morrin | July 31, 1888 |
| 496,111 | Duncan | Apr. 25, 1893 |
| 944,759 | Worden et al. | Dec. 28, 1909 |
| 1,049,748 | Marischka | Jan. 7, 1913 |
| 1,290,091 | Cole | Jan. 7, 1919 |
| 1,812,080 | Chapman | June 30, 1931 |
| 1,952,867 | Jensen | Mar. 27, 1934 |
| 1,967,582 | Marischka | July 24, 1934 |
| 1,971,728 | Perry | Aug. 28, 1934 |

FOREIGN PATENTS

| Number | Country | Date |
|---|---|---|
| 423,991 | Great Britain | Feb. 12, 1935 |

OTHER REFERENCES

Ser. No. 303,852, Szigeth (A. P. C.), published April 27, 1943.